United States Patent [19]

Klein

[11] Patent Number: 4,637,790

[45] Date of Patent: Jan. 20, 1987

[54] MULTIPLE-STAGE PLASTICATING EXTRUDERS

[75] Inventor: Imrich Klein, Highland Park, N.J.

[73] Assignee: Scientific Process & Research, Inc., Somerset, N.J.

[21] Appl. No.: 744,022

[22] Filed: Jun. 12, 1985

[51] Int. Cl.⁴ .......... B29B 7/10

[52] U.S. Cl. .......... 425/208; 366/75; 366/81; 366/293; 425/209

[58] Field of Search .......... 159/2 E; 366/75, 76, 366/79, 81, 97, 293; 264/349, 176 C; 425/200, 203, 204, 205, 207, 208, 209, 376 R

[56] References Cited

U.S. PATENT DOCUMENTS

| | | | |
|---|---|---|---|
| 3,021,561 | 2/1962 | Reifenhäuser | 425/567 |
| 3,035,304 | 5/1962 | Reifenhäuser | 366/79 |
| 3,371,379 | 3/1968 | Reifenhäuser | 425/203 |
| 3,689,182 | 9/1972 | Kovacs | 425/208 |
| 3,712,594 | 1/1973 | Schippers et al. | 366/75 |
| 3,746,318 | 7/1973 | Schippers | 366/79 |
| 3,924,842 | 12/1975 | Klein et al. | 366/79 |
| 4,106,113 | 8/1978 | Laimer et al. | 425/207 |
| 4,290,702 | 9/1981 | Klein et al. | 366/78 |
| 4,387,997 | 6/1983 | Klein et al. | 425/208 |
| 4,472,059 | 9/1984 | Klein et al. | 366/79 |

*Primary Examiner*—Jay H. Woo
*Assistant Examiner*—J. Fortenberry
*Attorney, Agent, or Firm*—Samuelson & Jacob

[57] ABSTRACT

Plasticating extruders in which increased melting effectiveness is attained through multiple stages including at least one inner screw conveyor within an outer screw conveyor in a barrel for receiving unmelted solid material from the channel of the outer screw conveyor and conveying the received unmelted solid material in the channel of the inner conveyor in a direction parallel to and axially coextensive with the direction of travel of the material in the channel of the outer screw conveyor and melting the received unmelted solid material to bring melted material to a downstream location where the melted material from both channels merges to deliver a flow of fully melted material to a downstream discharge outlet. A vent may be located in the barrel in the vicinity where material enters the channel of the inner screw conveyor for improved venting as a result of the diversion of material away from the vent.

25 Claims, 8 Drawing Figures

332
474
386
384
490
488
480
464
382
380
390
388
372
370
318
470
468
492
366
364
368
331
392
312
300
328
326
322
320
330
514
526
522
532
536
520
524
530
534
546
512
500
544
540
542
548
516
518

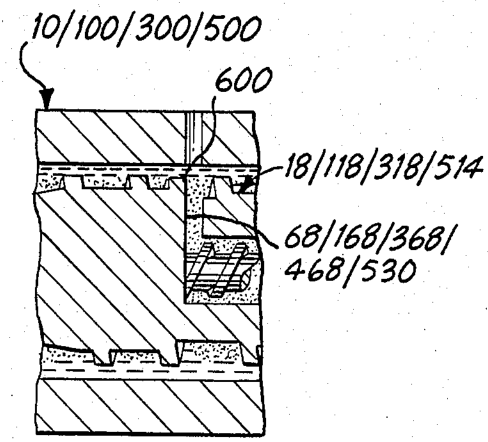
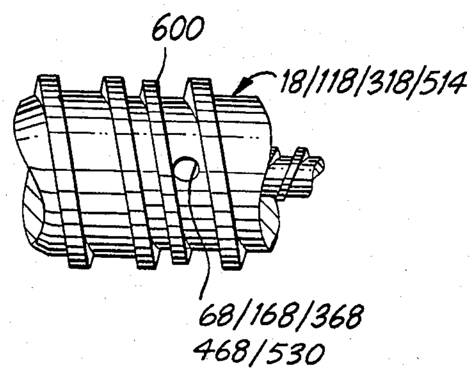
FIG. 5
FIG. 6
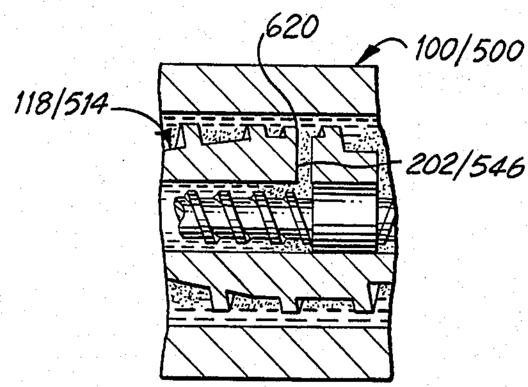
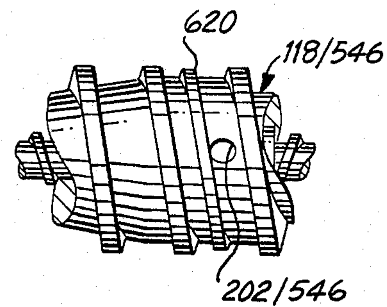
FIG. 7
FIG. 8

MULTIPLE-STAGE PLASTICATING EXTRUDERS

The present invention relates generally to plasticating extruders and pertains, more specifically, to plasticating extruders which attain increased melting effectiveness without a concomitant increase in size and power consumption.

In U.S. Pat. No. 3,021,561, there is disclosed plasticating apparatus in which material is introduced to both an outer screw conveyer and an inner screw conveyor located within the outer screw conveyor.

In U.S. Pat. No. 3,689,182, there is disclosed plasticating apparatus in which the melted fluid formed in the channel of the screw conveyor is separated from the solid material as rapidly as the melted fluid is formed by conducting it into an axially-extending passage within the screw conveyor.

In U.S. Pat. No. 3,924,842, there is disclosed plasticating apparatus in which the screw conveyor includes an internal passage which communicates with the external main channel of the screw conveyor at locations enabling unmelted solids to enter the passage at a downstream location and proceed upstream to be melted and reintroduced into the main channel at an upstream location, thereby facilitating the entire plasticating operation.

In U.S. Pat. No. 4,387,997, there is disclosed a screw conveyor having an internal backfeed passage and a secondary, solids-directing flight located on the screw conveyor for directing unplasticated material into the backfeed passage.

An object of the present invention is to provide vented plasticating extruders in which unmelted solids are drained from the external main channel of the screw conveyor into an internal passage within the screw conveyor wherein the unmelted solids are moved in a downstream direction, parallel to the material in the main channel, such that drained material is melted in the internal passage and merges with the melted material from the main channel downstream so as to accomplish improved venting as well as more effective plastication of the solid material introduced into the plasticating extruder.

Another object of the invention is to provide plasticating extruders of the type described and in which increased melting effectiveness is attained without a concomitant increase in size and power consumption.

Still another object of the invention is to provide plasticating extruders of the type described and in which the residence time of material in the extruder is reduced.

Yet another object of the invention is to provide plasticating extruders in which a multiple-stage melting arrangement is available for use within the confines of the dimensions of current extruders.

A further object of the invention is to provide plasticating extruders having improved venting.

A still further object of the invention is to provide plasticating extruders which are economical to manufacture and attain increased economy of operation.

The above objects, as well as still further objects and advantages, are attained by the present invention which may be described briefly as providing an improvement in a multiple-stage plasticating extruder of the type having an axially-extending elongate barrel for preparing a plasticated material from solids introduced into the extruder and delivering the plasticated material to a discharge outlet, the improvement comprising: a first screw conveyor for extending along a longtudinal axis in the barrel, the first screw conveyor including a first-stage flight defining a first-stage channel for continuously conveying the material in a downstream direction between a supply of the solids and a first-stage outlet for the plasticated material, as the material is melted within the first-stage channel, the first-stage flight having a leading face facing downstream and a trailing face facing upstream, the first-stage channel extending between the leading face and the trailing face; a second-stage passage within the screw conveyor, the second-stage passage being axially coextensive with the first-stage channel and communicating with the first-stage channel at an upstream location and at a downstream location to establish a multiple-stage melting path within the axial extent of the first screw conveyor along which the material will move through the first-stage channel and the second-stage passage, the upstream location being in position to receive some unplasticated material from the first-stage channel, and the downstream location being spaced axially downstream of the upstream location a distance sufficient to enable plastication within the second-stage passage of unplasticated material admitted to the second-stage passage; a drainage opening interconnecting the first-stage channel and the second-stage passage at the upstream location for enabling the flow of unplasticated material into the second-stage passage at the upstream location; a second-stage outlet establishing the communication between the second-stage passage and the first-stage channel for enabling the flow of plasticated material from the second-stage passage to merge with the flow of plasticated material from the first-stage channel for delivery of all of the plasticated material to the discharge outlet; and a second screw conveyor located in the second-stage passage and including a second-stage flight defining a second-stage channel arranged to convey material from the upstream location to the downstream location so as to enable movement of material along the multiple-stage melting path through the second-stage passage. The invention provides improved venting arrangements for plasticating extruders by locating a vent in the vicinity of the drainage opening.

The invention will be understood more fully, while still further objects and advantages will become apparent, in the following detailed description of preferred embodiments thereof illustrated in the accompanying drawing, in which:

FIG. 5 is a fragmentary view of a portion of any of the representations of FIGS. 1 through 4 modified to illustrate a further improvement;

FIG. 6 is a plan view of a portion of the fragment of FIG. 5;

FIG. 7 is a fragmentary view of a portion of the representation of either one of FIGS. 2 and 4 modified to illustrate a further improvement; and FIG. 8 is a plan view of a portion of the fragment of FIG. 7.

Figure 1:
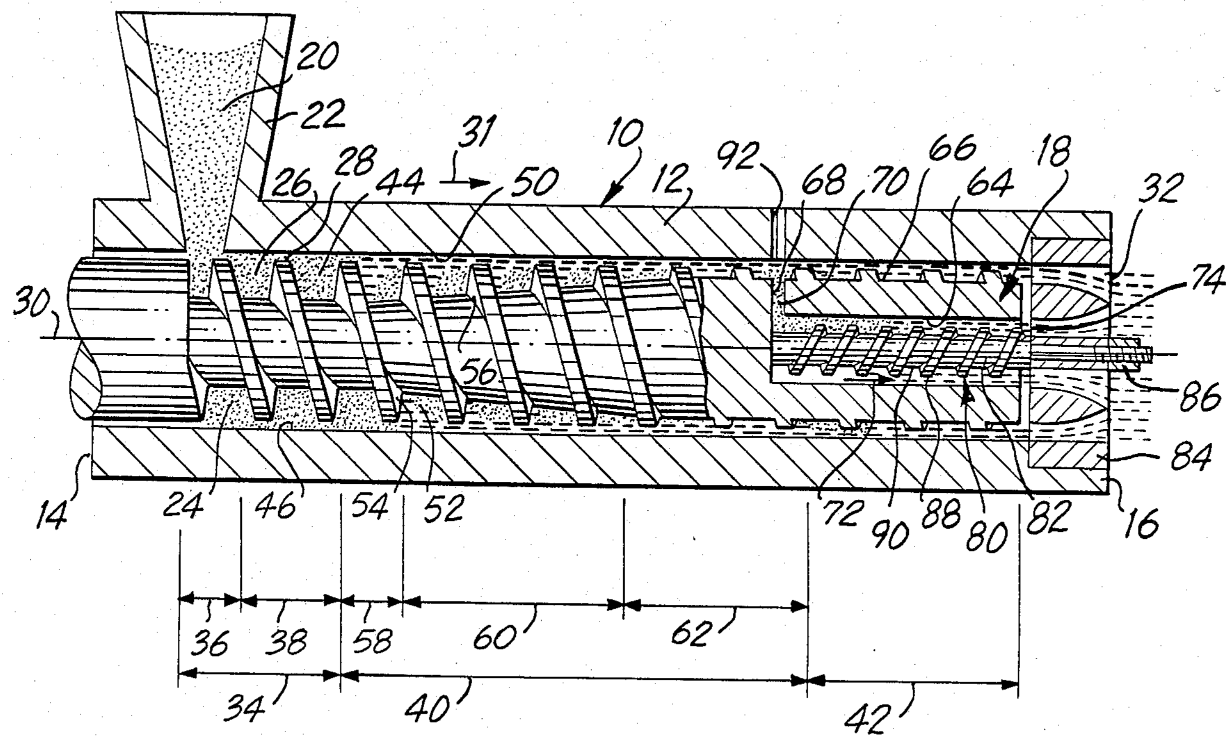
FIG. 1 is a somewhat schematic representation of a plasticating extruder utilizing the improvement of the present invention.

Referring now to the drawing, and especially to FIG. 1 thereof, a plasticating extruder constructed in accordance with the invention is illustrated somewhat schematically at 10. Extruder 10 includes a barrel 12, extending axially between an upstream end 14 and a downstream end 16, and a screw conveyor 18 in the barrel 12. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel 12, about longitudinal axis 30, will advance the material 20 along the channel 28 in a downstream direction 31 until the material is delivered, in melted form, to a discharge outlet 32 at the downstream end 16 of the barrel 12.

Extruder 10 is divided into functional zones; namely, a solids conveying zone 34, which includes a hopper zone 36 and a delay zone 38, a melting zone 40, and a melt conveying zone 42. The solids are compacted into a solid bed 44 and, where the inner surface 46 of the barrel 12 reaches the melting point of material 20, the resulting melt forms a continuous film 50.

In the melting zone 40, a melt pool 52 begins to form, cross-channel between the leading face 54 of flight 28, which faces downstream, and the confronting trailing face 56 of flight 28, which faces upstream. The melt pool 52 is juxtaposed with the leading face 54 of flight 28 and gradually replaces the progressively melting solid bed 44 along the melting zone 40. The melt film 50 is fed continuously from the solid bed 44 and, as the volume of the solid bed decreases, and the volume of the melt increases, the melt spills into the low shear melt pool 52, all as explained in the above-cited U.S. Pat. No. 3,924,842.

Melting zone 40 itself is divided into three geometrical sections; namely, a relatively deep section 58, of essentially constant depth, a compression section 60 downstream of deep section 58 and having a depth which decreases in the downstream direction, and a relatively shallow section 62 of essentially constant depth downstream of compression section 60.

Extruder 10 is provided with a second-stage passage 64 extending axially through the interior of the arbor 66 of screw conveyor 18, parallel to and coextensive with the first-stage channel 26. Second-stage passage 64 communicates with the first-stage channel 26 through a drainage opening 68 placed at an upstream location in position to receive some of the unmelted solids in the first-stage channel 26. Thus, drainage opening 68 is positioned with respect to first-stage channel 26 such that drained unmelted material 70 will enter the second-stage passage 64 and will travel in a downstream direction 72, and is located adjacent to and preferably immediately behind trailing face 56 of flight 28 to assure that some of the unmelted solids will pass through opening 68.

Drained material 70 is melted as the material travels downstream through second-stage passage 64 to a downstream location where the second-stage passage 64 communicates with the first-stage channel 26 through a second-stage outlet 74 located at the downstream location. Thus, the flow of material from the second-stage passage 64 merges with the flow of material from the first-stage channel 26 so that all of the melted material is delivered at the discharge outlet 32. In this manner, melting capacity is increased without a concomitant increase in the overall dimensions of the extruder, with an overall increase in melting efficiency. In addition, residence time of the processed material in the extruder is reduced, providing advantages with some materials, such as, for example, rigid or unstabilized PVC, which can be injured by longer times at higher temperatures.

In order to facilitate movement of the drained material 70 in the downstream direction through second-stage passage 64, a second or inner screw conveyor 80 is inserted into passage 64. Inner screw conveyor 80 extends axially along second-stage passage 64 and has an arbor 82 which is affixed to barrel 12 by a perforated mounting plate 84 to which the arbor 82 is secured by a threaded connection at 86. A flight 88 extends along the length of inner screw conveyor 80 within the second-stage passage 64 and establishes a second-stage channel 90. Since the inner screw conveyor 80 is fixed to barrel 12, it remains stationary relative to the rotating outer screw conveyor 18. Hence, flight 88 is "flighted" in the opposite direction relative to flight 28 of outer screw conveyor 18; that is, the helix followed by flight 88 extends in a direction opposite to the helix of flight 28. In this manner, flight 88 exerts a force upon the drained material 70 in the downstream direction 72 from opening 68 toward second-stage outlet 74 and discharge outlet 32.

In addition to facilitating the downstream movement of material through the second-stage passage 64 and the melting of that material as the material travels through second-stage channel 90, the pumping action of the inner screw conveyor 80 tends to lower the pressure in the first-stage channel 26 in the vicinity of the drainage opening 68. By placing a vent 92 in barrel 12 in the vicinity of the drainage opening 68, where the pressure within the first-stage channel 26 is lower than it otherwise would be if no second-stage path through drainage opening 68 were present, a more effective venting arrangement is achieved, since material is diverted away from the vent by the second-stage path, thereby keeping the vent clear for venting purposes.

Figure 2:
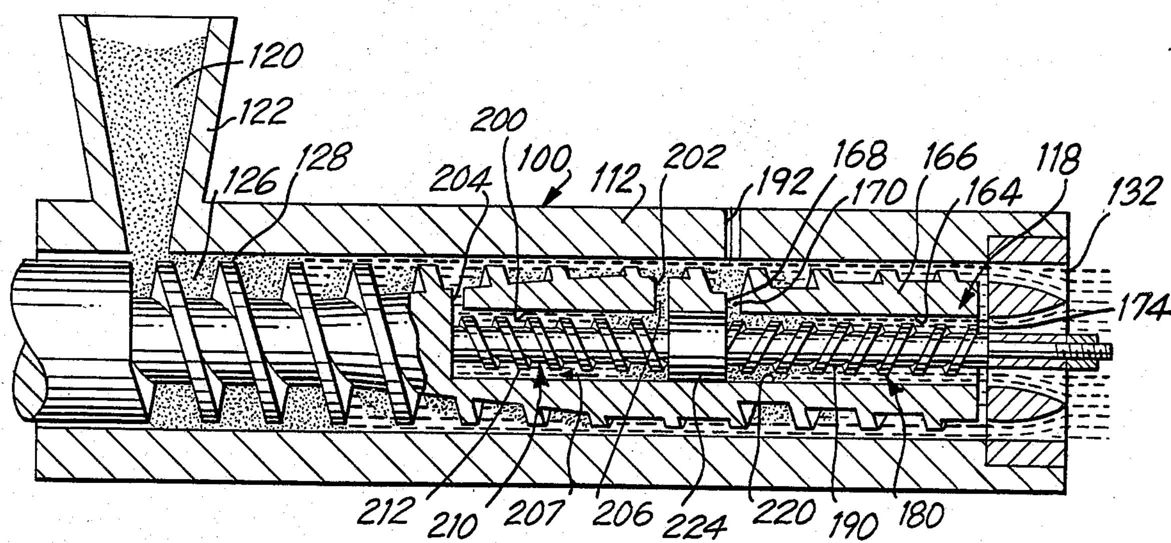
FIG. 2 is a similar, somewhat schematic representation of another plasticating extruder utilizing the improvement of the present invention.

Turning now to FIG. 2 of the drawing, there is illustrated an extruder which employs the improvement of the two-stage arrangement described above in connection with extruder 10 combined with the recirculation, or recycling arrangement of the aforesaid U.S. Pat. No. 3,924,842, to attain a unique compound extruder 100. Compound extruder 100 has a barrel 112 within which there is a first or outer screw conveyor 118. A reservoir of solid material 120 is held in a hopper 122 which feeds the material into a first-stage channel 126 defined by a helical flight 128 on the screw conveyor 118. Melted material is delivered at a discharge outlet 132 at the downstream end of the barrel 112.

As in the embodiment of FIG. 1, a second-stage passage 164 extends through the interior of the arbor 166 of screw conveyor 118 and a drainage opening 168 passes solid material 170 to the second-stage passage 164 where the material is moved downstream to a second-stage outlet 174 by an inner screw conveyor 180 to be melted within a second-stage channel 90 and merged with the melted material from first-stage channel 126 at discharge outlet 132. A vent 192 may be provided in the vicinity of drainage opening 168.

Extruder 100 is provided with a backfeed passage 200 extending through the interior of arbor 166 of screw conveyor 118. Backfeed passage 200 communicates with first-stage channel 126 at a downstream location at an opening 202 and at an upstream location at an opening 204. Opening 202 is a drainage opening for unmelted solids and is positioned with respect to channel 126 such that some unmelted solids 206 will enter the backfeed passage 200 and will travel in an upstream direction 207 to opening 204 which is a melt-return aperture and is positioned with respect to channel 126 such that the drained material 208 passing through the backfeed passage 200 will be reintroduced into the channel 126, upstream in the channel. Opening 202 is located adjacent to and preferably immediately behind the trailing face of flight 128 to assure that unmelted solids will pass through opening 202. Opening 204 is located adjacent to and preferably immediately ahead of the leading face of flight 128 so that drained material 206 which passes through backfeed passage 200 re-enters channel 126 at a location where there is likely to be melted material. At least part of the drained material 206 ordinarily will be melted as it travels along backfeed passage 200 so that the drained material will be reintroduced into channel 126 in at least partially melted form. Thus, melting efficiency is increased and the quality of the extrudate is enhanced.

In order to facilitate movement of the drained material 206 in the upstream direction 207 and thereby attain the desired effectiveness of backfeed passage 200, another inner screw conveyor 210 extends into the backfeed passage 200. A flight 212 extends along the length of the inner screw conveyor 210 and is "flighted" in the same direction as the flight 128 of the outer screw conveyor 118. In this manner, flight 212 exerts a force upon the drained material 206 in the upstream direction 207 from opening 202 to opening 204. As shown, backfeed passage 200 and second-stage passage 164 share a common bore 220 within the arbor 166 of screw conveyor 118, the backfeed passage 200 being an upstream extension of the bore 220 while the second-stage passage 164 occupies a downstream portion of the bore 220. While bore 220 is illustrated as having the same diameter in both the backfeed passage 200 and the second-stage passage 164, it will be apparent that the backfeed passage 200 and the second-stage passage 164 may be of different diameters. Screw conveyro 210 is integral with screw conveyor 180 so that both inner screw conveyors 180 and 210 are affixed to the barrel 112 at a mounting plate 222 to support the inner screw conveyors and maintain both inner screw conveyors 180 and 210 stationary relative to rotating outer screw conveyor 118. A cylindrical dam 224 is integral with the inner screw conveyors 180 and 210 and is placed between the inner screw conveyors 180 and 210 to separate the backfeed passage 200 from the second-stage passage 164. The combination of the recirculation arrangement with the second-stage arrangement to establish compound extruder 100 enables an even greater melting capacity within the confines of the dimensions of a conventional extruder.

Figures 3, 4:
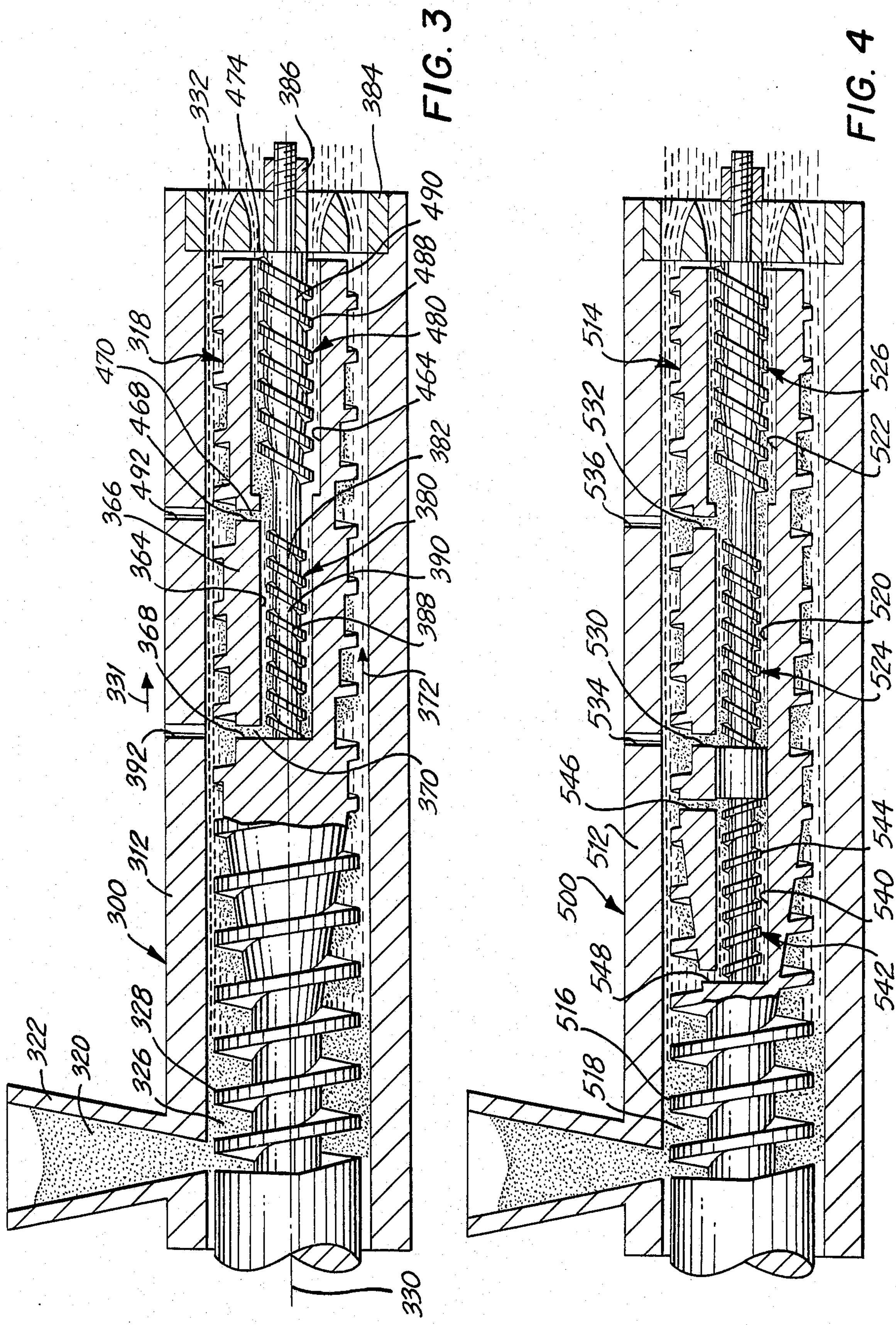
FIG. 3 is a somewhat schematic representation of still another plasticating extruder utilizing the improvement of the present invention.
FIG. 4 is another somewhat schematic representation of yet another plasticating extruder utilizing the improvement of the present invention.

In FIG. 3 there is illustrated a three-stage extruder 300 constructed in accordance with the invention. Extruder 300 has a barrel 312, and a screw conveyor 318. A reservoir of solid material 320 is held in a hopper 322 which feeds the material 320 into a first-stage channel 326 defined by a helical flight 328 on the screw conveyor 318. Rotation of the screw conveyor 318 about a longitudinal axis 330 advances the material 320 along the first-stage channel 326 in a downstream direction 331 to deliver the material to a discharge outlet 332.

Extruder 300 includes a second-stage passage 364 extending axially within the interior of arbor 366 of the screw conveyor 318. A drainage opening 368 is placed at an upstream location and is positioned with respect to the first-stage channel 326 such that drained unmelted material 370 will enter the second-stage passage 364 and will travel in a donwstream direction 372. A second screw conveyor 380 extends axially along second-stage passage 364 and has an arbor 382 affixed to barrel 312 by a perforated plate 384 to which arbor 382 is secured at 386. A flight 388 on screw conveyor 380 establishes a second-stage channel 390 and facilitates movement of the drained material 370 in the downstream direction 372. Since inner screw conveyor 380 remains stationary relative to outer screw-conveyor 318, flight 388 is "flighted" in the opposite direction relative to flight 328 of outer screw conveyor 318. A first vent 392 is placed in the vicinity of drainage opening 368.

Extruder 300 includes a third-stage passage 464 which also extends axially within the interior of arbor 366. A drainage opening 468 is placed at an upstream location, relative to third-stage passage 464, and is positioned with respect to the first-stage channel 326 such that drained unmelted material 470 will enter the third-stage passage 464 and will travel in the downstream direction. A third screw conveyor 480 includes a flight 488 which establishes a third-stage channel 490 and is "flighted" to facilitate movement of the drained material 470 in the downstream direction to a third-stage outlet 474 where the drained material will merge with the material in first-stage channel 326 so that the merged materials are delivered to discharge outlet 332. A second vent 492 is placed in the vicinity of drainage opening 468. Such a double-vented construction is beneficial in the processing of certain materials, such as, for example, ABS and powdered PVC.

In order to accommodate the material delivered by the second screw conveyor 380 through the second-stage passage 364 to the third-stage passage 464, and to enhance melting and pumping throughout the second and third stages third-stage passage 464 and the corresponding third screw conveyor 480 preferably are provided with a diameter larger than the diameter of second-stage passage 364 and second screw conveyor 380. Alternative arrangements may be provided for increasing the pumping capacity of the third screw conveyor 480 to enable third-stage passage 464 to accommodate the necessary flow. Thus, the depth of third-stage channel 490 may be increased or the lead of the flight 488 may be increased to increase pumping capacity without increasing the diameter of third-stage passage 464.

In the embodiment of FIG. 4, a three-stage extruder 500 has a barrel 512 and a screw conveyor 514 having a flight 516 establishing a first-stage channel 518. Extruder 500 includes a second-stage passage 520 and a third-stage passage 522, each having a respective second screw conveyor 524 and third screw conveyor 526, much the same as extruder 300 described above, including respective drainage openings 530 and 532 and vents 534 and 536. However, the three-stage arrangement is combined with a recirculation, or recycling arrangement by the addition of a backfeed passage 540 within which there is a backfeed screw conveyor 542 having a flight 544 "flighted" in the same direction as the flight of screw conveyor 514 so that solid material which is drained at downstream opening 546 is moved upstream to be melted and delivered back into the first-stage channel 518 through a melt-return aperture 548, in a manner similar to that described above in connection with extruder 100.

As illustrated in FIGS. 5 and 6, any of the screw conveyors 18, 118, 318, or 514 of respective extruders 10, 100, 300, and 500 may be modified to include a supplemental solids-directing flight 600 located at least at a corresponding drainage opening 68, 168, 368, 468, 530 or 532, for directing some of the unmelted solids into the drainage opening. Likewise, as seen in FIGS. 7 and 8, either of the screw conveyors 118 or 514 of respective extruders 100 and 500 may be modified to include a further supplemental solids-directing flight 620 located at least at the corresponding downstream opening 202 or 546 for directing some of the unmelted solids into opening 202 or 546.

It is to be understood that the above detailed description of embodiments of the invention are provided by way of example only. Various details of design and construction may be modified without departing from the true spirit and scope of the invention, as set forth in the appended claims.

The embodiments of the invention in which an exclusive property or privilege is claimed are defined as follows:

1. In a multiple-stage plasticating extruder of the type having an axially-extending elongate barrel for preparing a plasticated material from solids introduced into the extruder and delivering the plasticated material to a discharge outlet, the improvement comprising:

a first screw conveyor for extending along a longitudinal axis in the barrel, said first screw conveyor including a first-stage flight defining a first-stage channel for continuously conveying the material in a downstream direction between a supply of said solids and a first-stage outlet for said plasticated material, as the material is melted within the first-stage channel, said first-stage flight having a leading face facing downstream and a trialing face facing upstream, said first-stage channel extending between the leading face and the trailing face;

a second-stage passage within the screw conveyor, said second-stage passage being axially coextensive with the first-stage channel and commumicating with the first-stage channel at an upstream location and at a downstream location to establish a multiple-stage melting path within the axial extent of the first screw conveyor along which the material will move through the first-stage channel and the second-stage passage, the upstream location being in position to receive some unplasticated material from the first-stage channel, and the downstream location being spaced axially downstream of the upstream location a distance sufficient to enable plastication within the second-stage passage of unplasticated material admitted to the second-stage passage;

a drainage opening interconnecting the first-stage channel and the second-stage passage at the upstream location for enabling the flow of unplasticated material into the second-stage passage at the upstream location;

a second-stage outlet establishing said communication between the second-stage passage and the first-stage channel for enabling the flow of plasticated material from the second-stage passage to merge with the flow of plasticated material from the first-stage channel for delivery of all of the plasticated material to the discharge outlet;

a second screw conveyor located in said second-stage passage and including a second-stage flight defining a second-stage channel arranged to convey material from the upstream location to the downstream location so as to enable movement of material along the multiple-stage melting path through the second-stage passage; and a vent in the barrel adjacent the upstream location.

2. The invention of claim 1 wherein the first-stage outlet and the second-stage outlet are located adjacent the discharge outlet.

3. The invention of claim 1 or 2 including a solids-directing flight on the first screw conveyor located at least at the drainage opening for directing unplasticated material into the drainage opening.

4. In a multiple-stage plasticating extruder of the type having an axially-extending elongate barrel for preparing a plasticated material from solids introduced into the extruder and delivering the plasticated material to a discharge outlet, the improvement comprising:

a first screw conveyor for extending along a longitudinal axis in the barrel, said first screw conveyor including a first-stage flight defining a first-stage channel for continuously conveying the material in a downstream direction between a supply of said solids and a first-stage outlet for said plasticated material, as the material is melted within the first-stage channel, said first-stage flight having a leading face facing downstream and a trailing face facing upstream, said first-stage channel extending between the leading face and the trailing face;

a second-stage passage within the first screw conveyor, said second-stage passage being axially coextensive with the first-stage channel and communicating with the first-stage channel at an upstream location and at a donwnstream location to establish a multiple-stage melting path within the axial extent of the first screw conveyor along which the material will move through the first-stage channel and the second-stage passage, the upstream location being in position to receive some unplasticated material from the first-stage channel, and the downstream location being spaced axially downsteam of the upstream location a distance sufficient to enable plastication within the second-stage passage of unplasticated material admitted to the second-stage passage;

a drainage opening interconnecting the first-stage channel and the second-stage passage at the upstream location for enabling the flow of unplasticated material into the second-stage passage at the upstream location;

a second-stage outlet establishing said communication between the second-stage passage and the first-stage channel for enabling the flow of plasticated material from the second-stage passage to merge with the flow of plasticated material from the first-stage channel for delivery of all of the plasticated material to the discharge outlet;

a second screw conveyor located in said second-stage passage and including a second-stage flight defining a second-stage channel arranged to convey material from the upstream location to the downstream location so as to enable movement of material along the multiple-stage melting path through the second-stage passage; and a third-stage passage within the first screw conveyor, said third-stage passage being axially coextensive with the first-stage channel and communicating with the first-stage channel at a further additional upstream location and at a further additional downstream location to establish an extended multiple-stage melting path within the axial extent of the first screw conveyor along which the material will move through the first-stage channel, the second-stage passage and the third-stage passage, the further additional upstream location being in position to receive some unplasticated material from the first-stage channel, and the further additional downstream location being spaced axially downstream of the further additional upstream location a distance sufficient to enable plastication within the third-stage passage of unplasticated material admitted to the third-stage passage;

a further drainage opening interconnecting the first-stage channel and the third-stage passage at the further additional upstream location for enabling the flow of unplasticated material into the third-stage passage at the further additional upstream location;

a third-stage outlet at the further additional downstream location, said third-stage outlet establishing said communication between the third-stage passage and the first-stage channel for enabling the flow of plasticated material from the third-stage passage to merge with the flow of plasticated material from the first-stage channel for delivery of all of the plasticated material to the discharge outlet; and a third screw conveyor located in said third-stage passage and including a third-stage flight defining a third-stage channel arranged to convey material from the further additional upstream location to the further additional downstream location so as to enable movement of material along the extended multiple-stage melting path through the third-stage passage.

5. The invention of claim 4 including a solids-directing flight on the first screw conveyor located at least at the further drainage opening for directing unplasticated material into the further drainage opening.

6. The invention of claim 4 including a vent in the barrel adjacent the further additional upstream location.

7. The invention of claim 4 wherein the third-stage passage is located downstream of the second-stage passage and communicates therewith.

8. The invention of claim 7 wherein the first-stage outlet and the third-stage outlet are located adjacent the discharge outlet.

9. The invention of claim 8 including a vent in the barrel adjacent the further additional upstream location.

10. The invention of claim 8 wherein the third-stage passage has a diameter greater than the diameter of the second-stage passage.

11. The invention of claim 10 wherein the third screw conveyor is integral with the second screw conveyor.

12. The invention of claim 10 including a vent in the barrel adjacent the further additional upstream location.

13. The invention of claim 10 including a vent in the barrel adjacent the upstream location and a further vent in the barrel adjacent the further additional upstream location.

14. The invention of claim 1 including:

a backfeed passage within the first screw conveyor, said backfeed passage being axially coextensive with the first-stage channel and communicating with the first-stage channel at a still further additional downstream location and at a still further additional upstream location to establish an extended flow circuit along which the material will move through the first-stage channel and the backfeed passage, the still further additional downstream location being in position to receive some unplasticated material from the channel, and the still further additional upstream location being spaced axially upstream of the still further downstream location a distance sufficient to enable plastication within the backfeed passage of unplasticated material admitted to the backfeed passage;

a still further additional drainage opening interconnecting the first-stage channel and the backfeed passage at the still further additional downstream location for enabling the flow of unplasticated material into the backfeed passage at the still further additional downstream location;

a melt return aperture interconnecting the backfeed passage and the first-stage channel at the still further additional upstream location for enabling the flow of plasticated material from the backfeed passage to the first-stage channel at the still further additional upstream location; and a further additional screw conveyor located in said backfeed passage and arranged to convey material from the still further additional downstream location to the still further additional upstream location so as to enable recirculation of material along the extended flow circuit through the backfeed passage.

15. The invention of claim 14 wherein the backfeed passage is located upstream of the second-stage passage, with the still further additional downstream location being located upstream of the first said drainage opening.

16. The invention of claim 15 wherein the further screw conveyor is integral with the second screw conveyor.

17. The invention of claim 16 wherein the third screw conveyor is integral with the second screw conveyor and the further screw conveyor.

18. The invention of claim 4 including:

a backfeed passage within the first screw conveyor, said backfeed passage being axially coextensive with the first-stage channel and communicating with the first-stage channel at a still further additional downstream location and at a still further additional upstream location to establish an extended flow circuit along which the material will move through the first-stage channel and the backfeed passage, the still further additional downstream location being in position to receive some unplasticated material from the channel, and the still further additional upstream location being spaced axially upstream of the still further additional downstream location a distance sufficient to enable plastication within the backfeed passage of unplasticated material admitted to the backfeed passage;

a still further drainage opening interconnecting the first-stage channel and the backfeed passage at the still further additional downstream for enabling the flow of unplasticated material into the backfeed passage at the still further additional downstream location;

a melt return aperture interconnecting the backfeed passage and the first-stage channel at the still further additional upstream location for enabling the flow of plasticated material from the backfeed passage to the first-stage channel at the still further additional upstream location; and a further screw conveyor located in said backfeed passage and arranged to convey material from the still further additional downstream location to the still further additional upstream location so as to enable recirculation of material along the extended flow circuit through the backfeed passage.

19. The invention of claim 18 wherein the backfeed passage is located upstream of the second-stage passage, with the still further additional downstream location being located upstream of the first said drainage opening.

20. The invention of claim 19 wherein the further screw conveyor is integral with the second screw conveyor.

21. The invention of claim 20 wherein the third screw conveyor is integral with the second screw conveyor and the further screw conveyor.

22. The invention of claim 19 including a vent in the barrel adjacent the upstream location.

23. In a multiple-stage plasticating extruder of the type having an axially-extending elongate barrel for preparing a plasticated material from solids introduced into the extruder and delivering the plasticated material to a discharge outlet, the improvement comprising:

a first screw conveyor for extending along a longitudinal axis in the barrel, said first screw conveyor including a first-stage flight defining a first-stage channel for continuously conveying the material in a downstream direction between a supply of said solids and a first-stage outlet for said plasticated material, as the material is melted within the first-stage channel, said first-stage flight having a leading face facing downstream and a trailing face facing upstream, said first-stage channel extending between the leading face and the trailing face;

a second-stage passage within the screw conveyor, said second-stage passage being axially coextensive with the first-stage channel and communicating with the first-stage channel at an upstream location and at a downstream location to establish a multiple-stage path within the axial extent of the first screw conveyor along which the material will move through the first-stage channel and the second-stage passage, the upstream location being in position to receive material from the first-stage channel;

a drainage opening interconnecting the first-stage channel and the second-stage passage at the upstream location for enabling the flow of material into the second-stage passage at the upstream location;

a second-stage outlet establishing said communication between the second-stage passage and the first-stage channel for enabling the flow of material from the second-stage passage to merge with the flow of material from the first-stage channel for delivery of all of the material to the discharge outlet;

a second screw conveyor located in said second-stage passage and including a second-stage flight defining a second-stage channel arranged to convey material from the upstream location to the downstream location so as to enable movement of material along the multiple-stage path through the second-stage passage; and a vent in the barrel adjacent the drainage opening;

the upstream location being spaced axially upstream of the downstream location a distance sufficient to divert the material in the vicinity of the vent away from the vent.

24. The invention of claim 23 including:

a third-stage passage within the first screw conveyor, said third-stage passage being axially coextensive with the first-stage channel and communicating with the first-stage channel at a further additional upstream location and at a further additional downstream location to establish an extended multiple-stage path within the axial extent of the first screw conveyor along which the material will move through the first-stage channel, the second-stage passage and the third-stage stage passage, the further additional upstream location being in position to receive materail from the first-stage channel;

a further drainage opening interconnecting the first-stage channel and the third-stage passage at the further additional upstream location for enabling the flow of material into the third-stage passage at the further additional upstream location;

a third-stage outlet at the further additional downstream location, said third-stage outlet establishing said communication between the third-stage passage and the first-stage channel for enabling the flow of material from the third-stage passage to merge with the flow of material from the first-stage channel for delivery of all of the material to the discharge outlet;

a third screw conveyor located in said third-stage passage and including a third-stage flight defining a third-stage channel arranged to convey material from the further additional upstream location to the further additional downstream location so as to enable movement of material along the extended multiple-stage melting path through the third-stage passage; and a further vent in the barrel adjacent the further drainage opening;

the further additional upstream location being spaced axially upstream of the further additional downstream location a distance sufficient to divert the material in the vicinity of the vent away from the vent.

25. The invention of claim 23 or 24 including:

a backfeed passage within the first screw conveyor, said backfeed passage being axially coextensive with the first-stage channel and communicating with the first-stage channel at a still further additional downstream location and at a still further additional upstream location to establish an extended flow circuit along which the material will move through the first-stage channel and the backfeed passage, the still further additional downstream location being in position to receive some unplasticated material from the channel, and the still further additional upstream location being spaced axially upstream of the still further additional downstream location a distance sufficient to enable plastication within the backfeed passage of unplasticated material admitted to the backfeed passage;

a still further drainage opening interconnecting the first-stage channel and the backfeed passage at the still further additional downstream location for enabling the flow of unplasticated material into the backfeed passage at the still further additional downstream location;

a melt return aperture interconnecting the backfeed passage and the first-stage channel at the still further additional upstream location for enabling the flow of plasticated material from the backfeed passage to the first-stage channel at the still further additional upstream location; and a further screw conveyor located in said backfeed passage and arranged to convey material from the still further additional downstream location to the still further additional upstream location so as to enable recirculation of material along the extended flow circuit through the backfeed passage.

* * * * *